US009602979B2

(12) United States Patent
Kwon et al.

(10) Patent No.: US 9,602,979 B2
(45) Date of Patent: *Mar. 21, 2017

(54) APPARATUS AND METHOD FOR TRANSMITTING AND RECEIVING A FRAME INCLUDING CONTROL INFORMATION IN A BROADCASTING SYSTEM

(71) Applicant: Samsung Electronics Co., Ltd., Gyeonggi-do (KR)

(72) Inventors: Hwan-Joon Kwon, Gyeonggi-do (KR); Hak-Ju Lee, Incheon (KR); Yeon-Ju Lim, Seoul (KR); Hong-Sil Jeong, Seoul (KR); Jae-Yoel Kim, Gyeonggi-do (KR); Sung-Ryul Yun, Gyeonggi-do (KR); Seho Myung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 10 days.

This patent is subject to a terminal disclaimer.

(21) Appl. No.: 14/070,080

(22) Filed: Nov. 1, 2013

(65) Prior Publication Data
US 2014/0056208 A1 Feb. 27, 2014

Related U.S. Application Data

(63) Continuation of application No. 12/390,904, filed on Feb. 23, 2009.

(30) Foreign Application Priority Data

Feb. 21, 2008 (KR) .................. 10-2008-0015825
Mar. 13, 2008 (KR) .................. 10-2008-0023568
Mar. 14, 2008 (KR) .................. 10-2008-0024086

(51) Int. Cl.
H04L 12/56 (2006.01)
H04W 4/06 (2009.01)
(Continued)

(52) U.S. Cl.
CPC .............. *H04W 4/06* (2013.01); *H04H 20/93* (2013.01); *H04H 60/25* (2013.01); *H04H 20/42* (2013.01);
(Continued)

(58) Field of Classification Search
CPC ....................................... H04L 12/56
(Continued)

(56) References Cited

U.S. PATENT DOCUMENTS 5,404,355 A 4/1995 Raith
7,616,593 B2 11/2009 Jung et al.
(Continued)

FOREIGN PATENT DOCUMENTS

CN 1960227 5/2007
CN 101022329 8/2007
(Continued)

OTHER PUBLICATIONS

"Frame structure channel coding and modulation for a second generation digital terrestrial television broadcasting system (DVB-T2)", Jan. 2008.
(Continued)

*Primary Examiner* — Brandon Renner
(74) *Attorney, Agent, or Firm* — The Farrell Law Firm, P.C.

(57) ABSTRACT

Apparatus and method for receiving a frame including control information in a broadcasting system are provided. A frame for a broadcast service is received and includes at least one Physical Layer Pipe (PLP) and indication information for indicating a change/no-change of control infor-
(Continued)

mation for the broadcast service in the next frame. Indication information, which includes information on a position in which the control information will change, is extracted from the frame and used to determine the position in which the control information will change.

8 Claims, 6 Drawing Sheets

(51) Int. Cl.
*H04H 20/93* (2008.01)
*H04H 60/25* (2008.01)
*H04L 12/933* (2013.01)
*H04L 12/54* (2013.01)
*H04H 20/42* (2008.01)
*H04H 60/13* (2008.01)

(52) U.S. Cl.
CPC .............. *H04H 60/13* (2013.01); *H04L 12/56* (2013.01); *H04L 49/1546* (2013.01); *Y02B 60/50* (2013.01)

(58) Field of Classification Search
USPC .................................................. 370/311–330
See application file for complete search history.

(56) References Cited

U.S. PATENT DOCUMENTS

| | | |
|---|---|---|
| 2006/0018269 A1 | 1/2006 | Agrawal et al. |
| 2006/0029011 A1 | 2/2006 | Etemad et al. |
| 2006/0030342 A1 | 2/2006 | Hwang et al. |
| 2006/0209734 A1* | 9/2006 | Son et al. ..................... 370/312 |
| 2006/0239264 A1* | 10/2006 | Kang et al. ................... 370/390 |
| 2006/0239265 A1 | 10/2006 | Son et al. |
| 2007/0260851 A1 | 11/2007 | Taha et al. |
| 2009/0103649 A1 | 4/2009 | Vare et al. |
| 2009/0190539 A1 | 7/2009 | Tanno et al. |
| 2009/0203326 A1 | 8/2009 | Vesma et al. |
| 2010/0027695 A1 | 2/2010 | Yan et al. |
| 2010/0107198 A1 | 4/2010 | Eum |
| 2011/0216666 A1 | 9/2011 | Radhakrishnan et al. |

FOREIGN PATENT DOCUMENTS

| | | |
|---|---|---|
| EP | 1 729 516 | 12/2006 |
| JP | 2006-340342 | 12/2006 |
| KR | 1020050107536 | 11/2005 |
| KR | 1020070120137 | 12/2007 |
| RU | 2 149 518 | 5/2000 |
| WO | WO 2007/148585 | 12/2007 |

OTHER PUBLICATIONS

Radio Broadcasting Systems; Digital Audio Broadcasting (DAB) to Mobile; Portable and Fixed Receivers, ETSI EN 300 401 V1.4.1, Jun. 1, 2006, 197 pages.

European Search Report dated Jul. 12, 2016 issued in counterpart application No. 09153321.6-1905, 11 pages.

* cited by examiner

APPARATUS AND METHOD FOR TRANSMITTING AND RECEIVING A FRAME INCLUDING CONTROL INFORMATION IN A BROADCASTING SYSTEM

PRIORITY

This application is a Continuation Application of U.S. application Ser. No. 12/390,904, which was filed in the U.S. Patent and Trademark Office on Feb. 23, 2009, and claims priority under 35 U.S.C. §119(a) to a Korean Patent Application filed in the Korean Intellectual Property Office on Feb. 21, 2008 and assigned Serial No. 10-2008-0015825, a Korean Patent Application filed in the Korean Intellectual Property Office on Mar. 13, 2008 and assigned Serial No. 10-2008-0023568, and a Korean Patent Application filed in the Korean Intellectual Property Office on Mar. 14, 2008 and assigned Serial No. 10-2008-0024086, the contents of each of which are incorporated herein by reference.

BACKGROUND OF THE INVENTION

1. Field of the Invention

The present invention relates generally to a broadcasting system, and in particular, to an apparatus and method for transmitting and receiving a frame including control information.

2. Description of the Related Art

Today, with the development of communication and broadcasting technologies, attempts are being made to find new ways to provide broadcast services in broadcasting systems or mobile communication systems, and discussions are currently underway on an advanced service capable of transmitting the common broadcast service such as voice and images, and also newer services such as packet data over broadcast service channels.

In addition, the broadcast services are making progress by adopting a variety of communication techniques to meet demands by users and consumers for digitalization, multi-channelization, broadband, high-quality, etc. Particularly, the increasing popularization of portable broadcast devices, including high-definition digital television and Portable Multimedia Player (PMP), has recently increased demands for various techniques to support the broadcast services.

FIG. 1 illustrates a frame structure for a broadcast service, to which the present invention is applied.

Referring to FIG. 1, a frame 101 includes a preamble 102, a Layer 1 (L1) signaling 103, a Layer 2 (L2) signaling 104, and at least one Physical Layer Pipe (PLP) 105, 106, . . . , 107. The preamble 102 includes information used to acquire time and frequency synchronization between a transmitter and a receiver, or to acquire synchronization for a frame boundary. The L1 signaling 103, which is a physical layer signaling, includes L1 static information 108, L1 configurable information 109, and L1 dynamic information 110. For reference, the L1 signaling is transmitted on a P2 symbol.

The L1 static information 108 includes information that is basically static over the passage of time. For example, the L1 static information 108 can include information on a cell identifier, a network identifier, a Radio Frequency (RF) channel number, a frame length, a pilot subcarrier location, etc.

The L1 configurable information 109 includes information that may change once in a while, although without changing on a frame-by-frame basis, i.e., information that generally lasts for a plurality of frames. For example, the L1 configurable information 109 can include information on a service identifier, a modulation order used for data transmission for an individual service, a code rate, etc. Herein, the unit in which the L1 static information 108 and the L1 configurable information 109 change is defined as a super-frame, which includes at least one frame.

The L1 dynamic information 110 includes information that may change on a frame-by-frame basis. For example, the L1 dynamic information 110 can include information related to a location where each PLP is transmitted in the current frame. More specifically, the L1 dynamic information 110 can include information about a start point and an end point of a corresponding PLP, i.e., location information for a plurality of PLPs that are transmitted over the frame. These locations of the PLPs are subject to change in a next frame.

The L2 signaling 104 represents a Medium Access Control (MAC) signaling, and a PLP in which the L2 signaling is transmitted is also referred to as "PLP0". The L2 signaling includes connection information between each PLP and a broadcast service channel. That is, the L2 signaling includes information indicating through which PLP a particular broadcast service is received.

A PLP_1 105, a PLP_2 106, and a PLP_N 107 transmit one or a plurality of broadcast service channels. The actual broadcast service data is transmitted through the PLP_1 105, the PLP_2 106, and the PLP_N 107. Therefore, the PLP_1 105, the PLP_2 106, and the PLP_N 107 can also be referred to as "data PLPs".

Below, a process of receiving broadcast service channels will be described with reference to FIG. 1.

Referring to FIG. 1, a receiver acquires synchronization with the frame 101 through the preamble 102, and acquires information, such as a data transmission scheme or a frame length, from the L1 signaling 103. Thereafter, based on the L2 signaling 104, the receiver determines which PLP transmits the broadcast service channel it desires to receive. Thereafter, the receiver receives actual broadcast data through data PLPs corresponding to the PLP_1 105, the PLP_2 106, and the PLP_N 107. As described above, in order to receive a broadcast service channel, the receiver receives, in sequence, the preamble 102, the L1 signaling 103, the L2 signaling 104, and the data PLPs 105 to 107 for every frame.

In communication systems, in-band signaling has been proposed to prevent the receiver from receiving the preamble 102, the L1 signaling 103, the L2 signaling 104, and the data PLPs 105 to 107 in sequence every frame, when it receives a broadcast service channel for a predetermined long time. The in-band signaling scheme transmits dynamic information 110 of an L1 signaling in the next frame using a particular PLP.

FIG. 2 illustrates a frame structure that supports a broadcast service with a conventional in-band signaling scheme. More specifically, FIG. 2 illustrates frames that are consecutive in time.

Referring to FIG. 2, a frame #k 202 is followed by a frame #(k+1) 202. More specifically, the frame #k 201 and the frame #(k+1) 202 are transmitted consecutively in time for reception of a broadcast service channel. The frame #k 201 and the frame #(k+1) 202 include preambles 203 and 209, L1 signalings 204 and 210, L2 signalings 205 and 211, and data PLPs 206, 207, 212, 213, and 214, respectively.

Assuming that a receiver is receiving a particular broadcast service channel, and in the frame #k 201, the receiver receives the broadcast service channel through a PLP_2 207, when the in-band signaling scheme is applied, the PLP_2

207 includes dynamic information indicating a location of a PLP_2 in the frame #(k+1) 202 which is the next frame. That is, from in-band signaling information 216 included in the PLP_2 207 received in the frame #k 201, the receiver can acquire information 217 used to receive the PLP_2 213 in the frame #(k+1) 202, which is the next frame for receiving the same broadcast service channel. Accordingly, the receiver can check or identify a location of the PLP_2 213 that transmits broadcast data, depending on the in-band signaling in the PLP_2 207 of the current frame, without receiving an L1 signaling 210 through a P2 in the next frame #(k+1) 202.

More specifically, according to the in-band signaling scheme, the receiver, which has completed receiving up to the PLP_2 207 in the frame #k 201, can power off its devices for receiving a variety of information, e.g., the preamble 209, the L1 signaling 210, and the L2 signaling 211, until it receives the PLP_2 213 of the next frame #(k+1) 202. As can be seen, the in-band signaling scheme was intended to reduce the power consumption of the receiver.

However, with regard to support for the actual broadcast service, the receiver using the in-band signaling scheme may actually fail to directly or substantially gain the desired power reduction effect. Commonly, this is caused because, in the conventional in-band signaling scheme, a transmitter transmits only the dynamic information in the L1 signaling 210 through the P2 of the next frame #(k+1) following the current frame #k. For these reasons, the actual receiver must perform an operation of receiving the L1 signaling 210 through the P2 in the frame #(k+1) 202 because the receiver may not normally receive the broadcast service as it has no information on a change/no-change in other information except for the dynamic information in the L1 signaling 210, i.e., L1 static information and L1 configurable information.

Consequently, the receiver powers on its receiving units in order to receive other information, i.e., the L1 static information and the L1 configurable information, except for the dynamic information in the L1 signaling 210. As a result, the conventional in-band signaling scheme fails to result in the intended power savings for the receiver.

In addition, as the conventional in-band signaling scheme transmits only the dynamic information of the P2-L1 signaling 210 in the next frame for a period of a particular PLP, it may eventually fail to provide information on the change/no-change in information of the L2 signaling 211, which indicates a mapping relationship between each PLP and the broadcast service channel.

More specifically, even though information in the L2 signaling 211 transmitted through the PLP0 has changed, if the receiver fails to detect the change, a fatal error may occur when the receiver receives broadcast data later on. Therefore, even though the conventional receiver utilizes the in-band signaling scheme, it may still have to receive the preamble 209, the L1 signaling 210, the L2 signaling 211, and the data PLPs 212 to 214 in sequence.

Accordingly, the current broadcasting system needs a new in-band signaling scheme that addresses the problems caused by the application of the conventional in-band signaling scheme. In addition, there is a need for a more accurate broadcast service transmission and reception method that may still utilize the in-band signaling scheme but prevents at least some of the reception errors of the broadcast data.

SUMMARY OF EMBODIMENTS OF THE INVENTION

The present invention has been designed to address at least the problems and/or disadvantages and to provide at least the advantages described below. Accordingly, an aspect of an embodiment of the present invention is to provide an apparatus and method for efficiently transmitting control information for a broadcast service by applying an improved in-band signaling scheme in a broadcasting system.

Another aspect of an embodiment of the present invention is to provide an apparatus and method for generating a frame for a broadcast service by applying an improved in-band signaling scheme and transmitting the frame in a broadcasting system.

Another aspect of an embodiment of the present invention is to provide an apparatus and method for including, in the current frame, indication information for indicating a change/no-change in control information included in the next frame, and transmitting the frame in a broadcasting system.

Another aspect of an embodiment of the present invention is to provide an apparatus and method for generating a superframe for a broadcast service by applying an improved in-band signaling scheme and transmitting the superframe in a broadcasting system.

Another aspect of an embodiment of the present invention is to provide an apparatus and method for including, in the current superframe, indication information for indicating a change/no-change in control information included in a next superframe, and transmitting the superframe in a broadcasting system.

Another aspect of an embodiment of the present invention is to provide an apparatus and method for efficiently receiving control information for a broadcast service to which an in-band signaling scheme is applied in a broadcasting system.

Another aspect of an embodiment of the present invention is to provide an apparatus and method for receiving a frame generated for an in-band signaling scheme, and receiving changed control information by checking an in-band signaling signal in the received frame in a broadcasting system.

Another aspect of an embodiment of the present invention is to provide an apparatus and method for selectively receiving control information by checking a change/no-change in control information of a next frame depending on an in-band signaling signal in a current frame in a broadcasting system.

Another aspect of an embodiment of the present invention is to provide an apparatus and method for receiving a superframe generated based on an in-band signaling scheme, and selectively receiving changed control information in a next superframe by checking an in-band signaling signal in a received superframe in a broadcasting system.

Another aspect of an embodiment of the present invention is to provide a reception apparatus and method for selectively controlling control information in a next superframe by checking indication information indicating a change/no-change in control information included in the next superframe, depending on a current superframe in a broadcasting system.

Another aspect of an embodiment of the present invention is to provide a reception apparatus and method for saving power of a receiver by transmitting and receiving control information related to a broadcast service in a frame using an improved in-band signaling scheme in a broadcasting system.

In accordance with an aspect of an embodiment of the present invention, a method is provided for receiving a frame including control information in a system supporting a broadcast service. The method includes receiving a frame that includes at least one Physical Layer Pipe (PLP) and indication information for indicating a change/no-change of control information for the broadcast service in a frame for a next transmission of the broadcast service, extracting the indication information from the frame, and determining a position in which the control information will change based on the indication information, wherein the indication information comprises information on the position in which the control information will change.

In accordance with another aspect of an embodiment of the present invention, an apparatus is provided for receiving a frame including control information in a system supporting a broadcast service. The apparatus includes a receiving unit configured for receiving a frame that includes at least one Physical Layer Pipe (PLP) and indication information for indicating a change/no-change of control information for the broadcast service in a frame for a next transmission of the broadcast service, a signal extractor configured for extracting the indication information from the frame, and a controller configured for determining a position in which the control information will change based on the indication information, wherein the indication information comprises information on the position in which the control information will change.

BRIEF DESCRIPTION OF THE DRAWINGS

The above and other aspects, features, and advantages of the embodiments of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EMBODIMENTS OF THE INVENTION

Different embodiments of the present invention will now be described in detail below with reference to the annexed drawings. In the following description, a detailed description of known functions and configurations incorporated herein has been omitted for clarity and conciseness.

The embodiments of the present invention define a superframe including at least one frame in a broadcasting system, and the term "superframe" as used throughout the specification indicates a unit in which L1 static information or L1 configurable information changes. For convenience, in the following description, it is assumed that a superframe includes just one frame, by way of example. However, the embodiments of the present invention are also applicable to a superframe including a plurality of frames.

The embodiments of the present invention provide schemes for generating and transmitting a broadcast service frame, wherein a transmitter includes, in the frame, indication information for indicating a change/no-change in control information in a next frame, for correct reception of a broadcast service at a receiver in a broadcasting system. Thus, the receiver can determine whether to turn on or off a particular one(s) of its receiving units depending on the change/no-change in the control information in the next frame through the current frame. That is, in accordance with an embodiment of the present invention, the receiver more accurately receives broadcast service data by checking a change/no-change in the control information.

Figure 1:
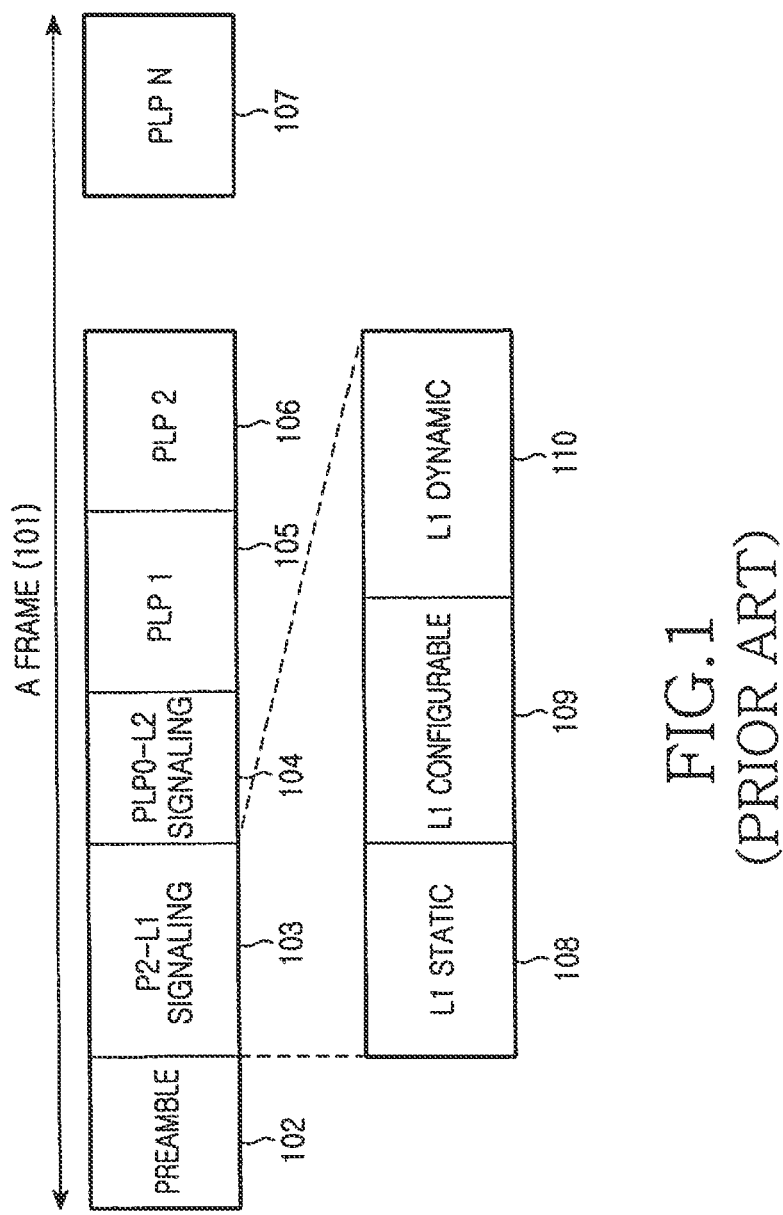
FIG. 1 illustrates a frame structure for a broadcast service, to which the present invention is applied.
Figure 2:
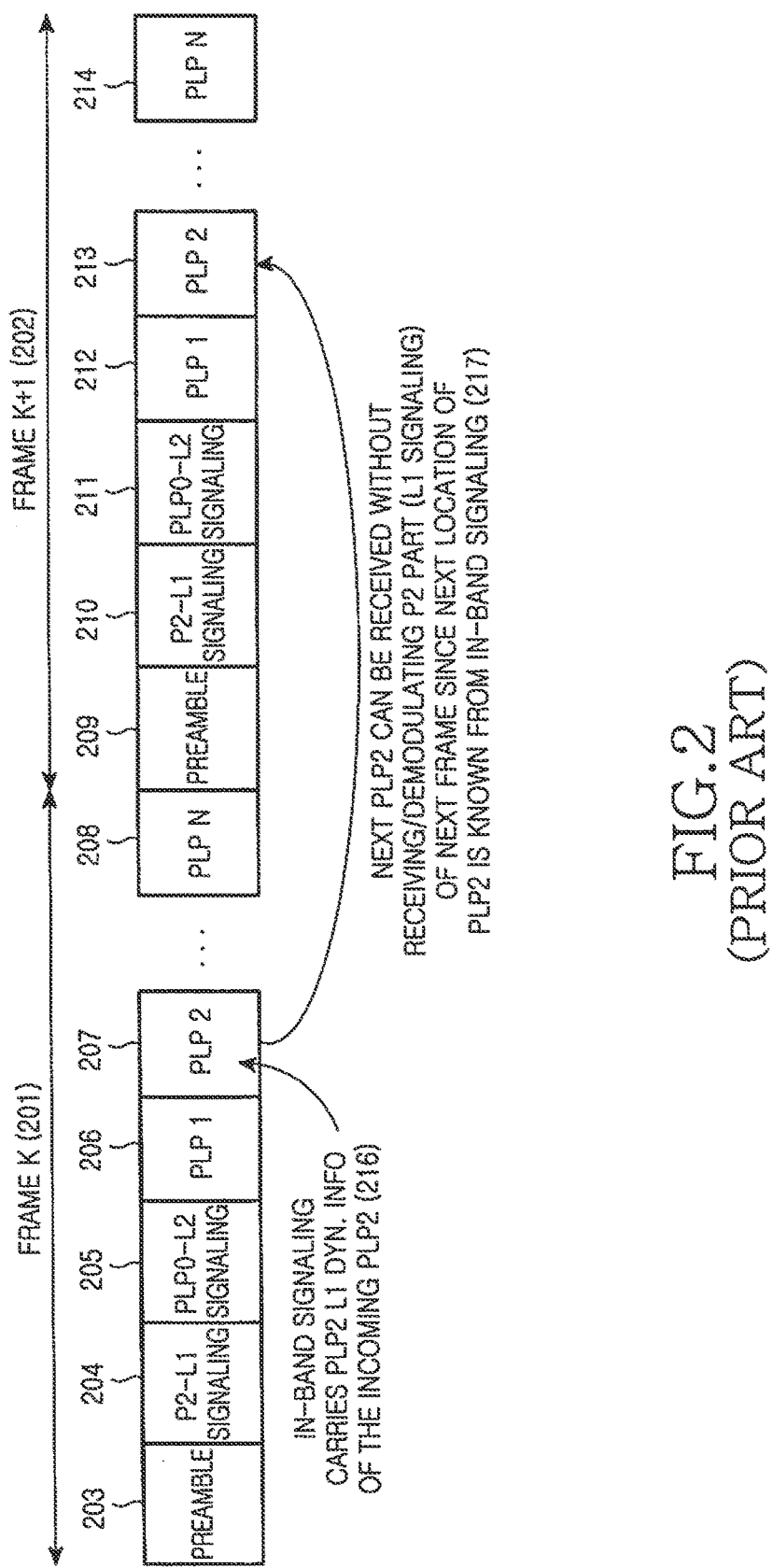
FIG. 2 illustrates a frame structure that supports a broadcast service with a conventional in-band signaling scheme.
Figure 3:
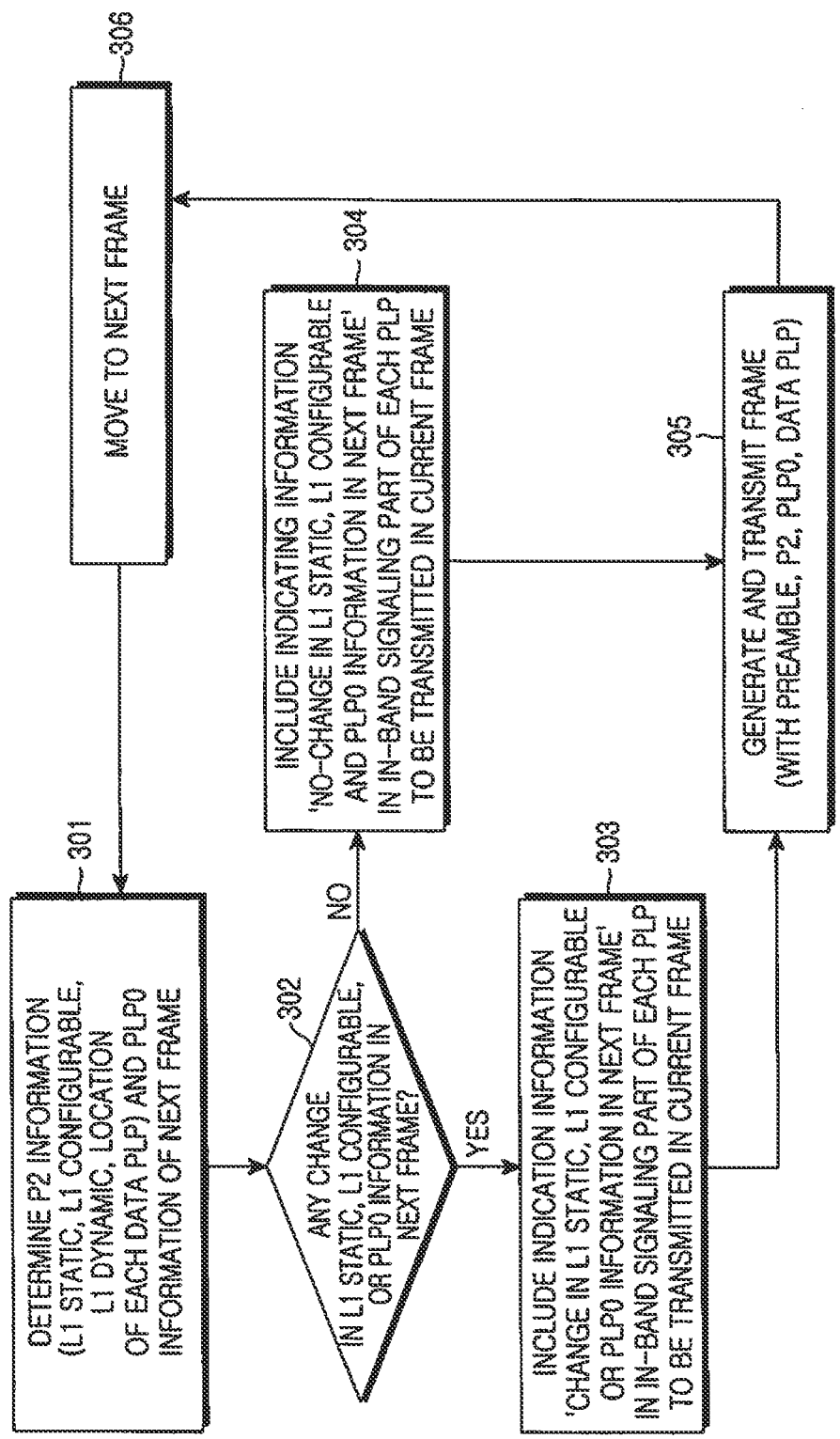
FIG. 3 illustrates an operation of a transmitter supporting a broadcast service according to an embodiment of the present invention.

FIG. 3 illustrates an operation of a transmitter supporting a broadcast service according to an embodiment of the present invention.

Referring to FIG. 3, before generating a current frame, a transmitter determines an L1 signaling to be transmitted through a P2 in a next frame, and L2 signaling information to be transmitted through a PLP0 in step 301. Herein, L1 static information, L1 configurable information, and L1 dynamic information can be included as the L1 signaling. The transmitter determines location information of a PLP, i.e., PLP0, through which the L2 signaling is transmitted, as the L2 signaling information. Also, a receiver determines location information for data PLPs with regard to the broadcast service.

In step 302, the transmitter determines whether the determined L1 static information, L1 configurable information, or PLP0 information to be transmitted in the next frame has changed from the L1 static information, L1 configurable information, or PLP0 information in the current frame. When the L1 static information, L1 configurable information, or PLP0 information has changed, in step 303, the transmitter sets indication information for indicating a change in L1 static information, L1 configurable information, or PLP0 information in the next frame, and includes the set indication information in an in-band signaling on a particular data PLP among the data PLPs to be transmitted in the current frame.

The embodiments of the present invention are also applicable to a case which the indication information indicates a change in L1 static information, L1 configurable information, L1 dynamic information, or PLP0 information in a next frame. However, the embodiments of the present invention described herein define the indication information to be set without the L1 dynamic information because the L1 dynamic information is the type of information that is changeable in every frame. The definitions can be alternatively selected by the system operator.

Referring back to step 302, when the L1 static information, L1 configurable information, or PLP0 information have not changed in the next frame, the transmitter sets indication information for indicating no-change in L1 static information, L1 configurable information, or PLP0 information in the next frame, and includes the set indication information with the no-change in an in-band signaling on each data PLP to be transmitted in the current frame in step 304.

In a first method of setting the indication information in steps 303 and 304, a predetermined bit can be allocated to each of the L1 static information, L1 configurable information, or PLP0 information in the current frame to indicate a change in the L1 static information, L1 configurable information, or PLP0 information in the next frame. For example, one bit is allocated to each of the L1 static information, L1 configurable information, or PLP0 information, such that the allocated bit with a value of "1" indicates a change in the corresponding information, while the bit with a value of "0"

indicates no-change in the corresponding information, or vice versa. Again, the specific definitions can be selected by the system operator.

As a second method for setting the indication information, one bit is allocated for all of the L1 static information, L1 configurable information, and PLP0 information, such that the allocated bit with a value of "1" indicates a change in any one of the allocated three types of information, while the bit with a value of "0" indicates no-change in any of the allocated three types of information, or vice versa.

As a third method for setting the indication information, multiple bits can be allocated for all of the L1 static information, L1 configurable information, and PLP0 information, to indicate which of the frames following the current frame the information changes.

For example, when 8 bits are allocated, "00000000" may indicate that no information changes in the next frame, while "00001010" (10 in decimal) indicates that any one of the L1 static information, L1 configurable information, or PLP0 information changes in the $10^{th}$ frame after the current frame. Accordingly, it is possible to extend the bit allocation for the L1 static information, L1 configurable information, or PLP0 information.

The transmitter sets indication information indicating a change/no-change in control information on a next frame in the current frame according to the present invention to enable the receiver to check a change/no-change in each bit corresponding to the indication information in the in-band signaling, i.e., L1 static information, L1 configurable information, or PLP0 information, so that the receiver can appropriately turn its power on or off. As a result, the receiver can selectively reduce power consumption.

In step 305, the transmitter generates or configures the current frame such that the current frame may include, a preamble, an L1 signaling, an L2 signaling, and at least one data PLP including indication information indicating a change/no-change in L1 static information, L1 configurable information, or PLP0 information in a next frame. The transmitter transmits the generated current frame to the receiver.

In step 306, the transmitter generates the next frame by performing the same process a described above in steps 301 to 305 on the next frame following the current frame.

Herein, the indication information can also be applied to indicate a change in the L1 static information, L1 configurable information, L1 dynamic information, or PLP0 information in a next frame in other embodiments of the present invention.

Figure 4:
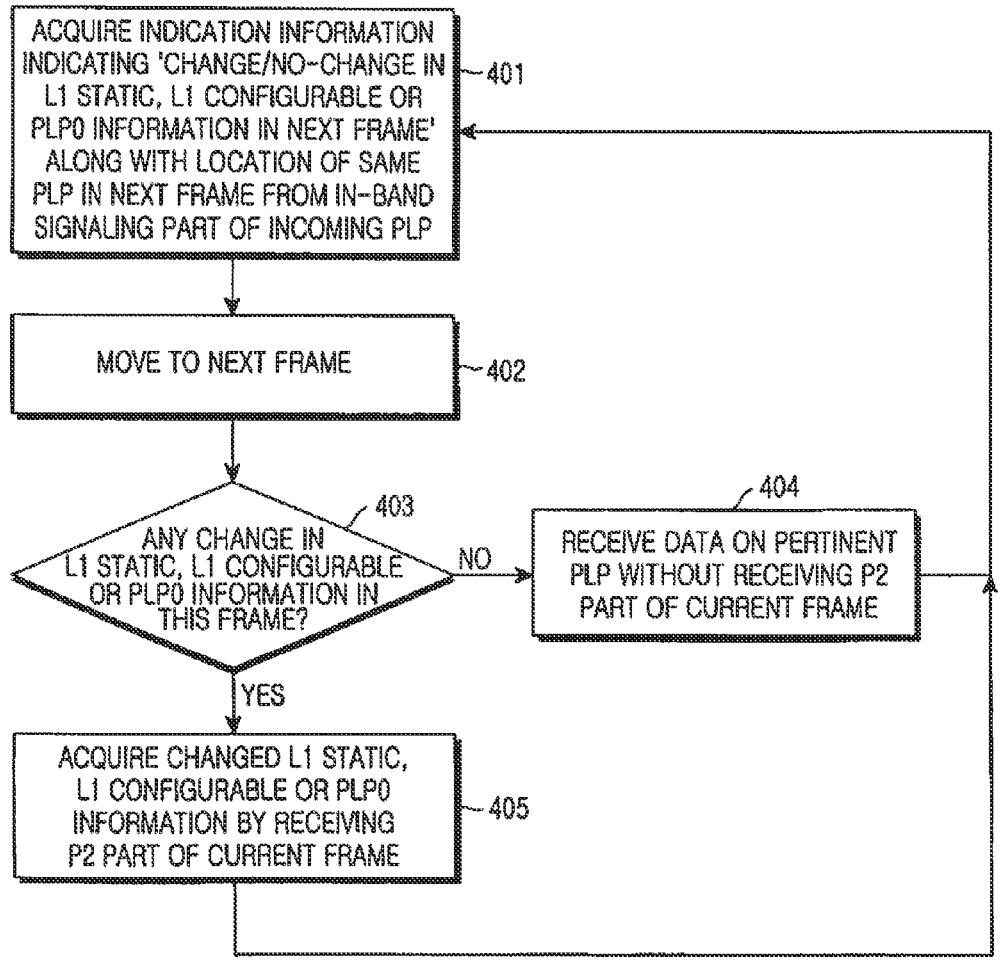
FIG. 4 illustrates an operation of a receiver supporting a broadcast service according to an embodiment of the present invention.

FIG. 4 illustrates an operation of a receiver supporting a broadcast service according to an embodiment of the present invention.

Referring to FIG. 4, in step 401, a receiver acquires indication information for indicating a change/no-change in L1 static information, L1 configurable information, or PLP0 information in a next frame, from an in-band signaling in a data PLP on the incoming current frame #k. Further, the receiver acquires location information, or L1 dynamic information, of the same PLP in the next frame. That is, in step 401, the receiver stores the acquired indication information for indicating a change/no-change in the location information (L1 dynamic information) of the same PLP, the L1 static information, the L1 configurable information, or the PLP0 information. Thereafter, the receiver receives a broadcast service channel through a data PLP(s) in the incoming current frame.

After completing the reception of the broadcast service channel in the incoming current frame, the receiver prepares to receive the next frame #(k+1) in step 402.

In step 403, the receiver determines whether L1 static information, L1 configurable information, or PLP0 information have changed at a start point of the next frame, based on the acquired indication information. When the indication information indicates no-change in the L1 static information, L1 configurable information, or PLP0 information, the receiver, in step 404, the receiver can also directly receive broadcast data at a location of the corresponding data PLP, without receiving the L1 signaling through a P2 or the L2 signaling through a PLP0 in the next frame #(k+1). Therefore, the receiver turns off its receiving units at a receiving point of the L1 signaling or the L2 signaling, because it has detected that there is no-change in the L1 signaling transmitted through the P2 or the L2 signaling transmitted through the PLP0. Thereafter, the receiver turns on its receiving units at receiving points of data PLPs transmitted, after the transmission of the L1 signaling or the L2 signaling, and receives a broadcast service channel transmitted through the data PLPs.

On the contrary, if the indication information indicates a change in the L1 static information, L1 configurable information, or PLP0 information, the receiver in step 403, in step 405, the receiver recognizes a change in the L1 signaling transmitted through the P2 or the L2 signaling transmitted through the PLP0, based on the indication information indicating the change in the L1 static information, L1 configurable information, or PLP0 information. Therefore, the receiver will receive the L1 signaling through the P2 in the next frame #(k+1), and acquire the changed L1 static information or L1 configurable information. Further, the receiver receives the L2 signaling through the PLP0 in the next frame #(k+1) and acquires the changed L2 signaling information, because the information included in the L1 signaling or the L2 signaling is important control information that is directly related to the reception of broadcast service data.

Therefore, after receiving the changed L1 static information, L1 configurable information, or PLP0 information, transmitted at a receiving point of the L1 signaling or the L2 signaling, the receiver receives a broadcast service channel by applying the changed L1 static information, L1 configurable information, or PLP0 information.

According to the third method of setting the indication information described, provided as an embodiment of the present invention, when the receiver recognizes that the change in the L1 static information, L1 configurable information, or PLP0 information will be made after the passage of one or multiple frames, the receiver will receive an L1 signaling through a P2 or an L2 signaling through a PLP0 in a frame indicated by the bits allocated for the indication information.

For example, when the indication information acquired in step 401 has an 8-bit value of "00001010" ('10' in decimal), the receiver recognizes that the L1 static information, L1 configurable information, or PLP0 information will change in the $10^{th}$ frame after the current frame. Therefore, when the current frame is assumed to be a $10^{th}$ frame, the receiver will receive an L1 signaling through a P2 or an L2 signaling through a PLP0 in the $10^{th}$ frame, without receiving an L1 signaling through a P2 or an L2 signaling through any PLP0 up to the $9^{th}$ frame.

That is, according to an embodiment of the present invention, the receiver can directly receive a corresponding data PLP in the $10^{th}$ frame, without receiving an L1 signaling through a P2 or an L2 signaling through any PLP0 up to the 9$^{th}$ frame, after the current frame. Here, the receiver may or my not receive the L1 and L2 signaling based on its available power.

After completing step 404 or 405, the receiver returns to step 401 and repeats steps 402 to 405 for the next frame.

As indicated above, although a superframe as described herein includes only one frame, by way of example, the embodiments of the present invention are also applicable to superframe including a plurality of frames.

In this case, the indication information given in steps 303 and 304 of FIG. 3 and step 401 of FIG. 4 can be defined to indicate a change/no-change in L1 static information, L1 configurable information, or PLP0 information in the next superframe. In other case, the indication information can be defined to indicate a change/no-change in the L1 static information, L1 configurable information, L1 dynamic information, or PLP0 information in the next frame in other exemplary embodiment of the present invention. Therefore, in step 403, the receiver can determine a change/no-change in control information on a superframe-by-superframe basis.

Figure 5:
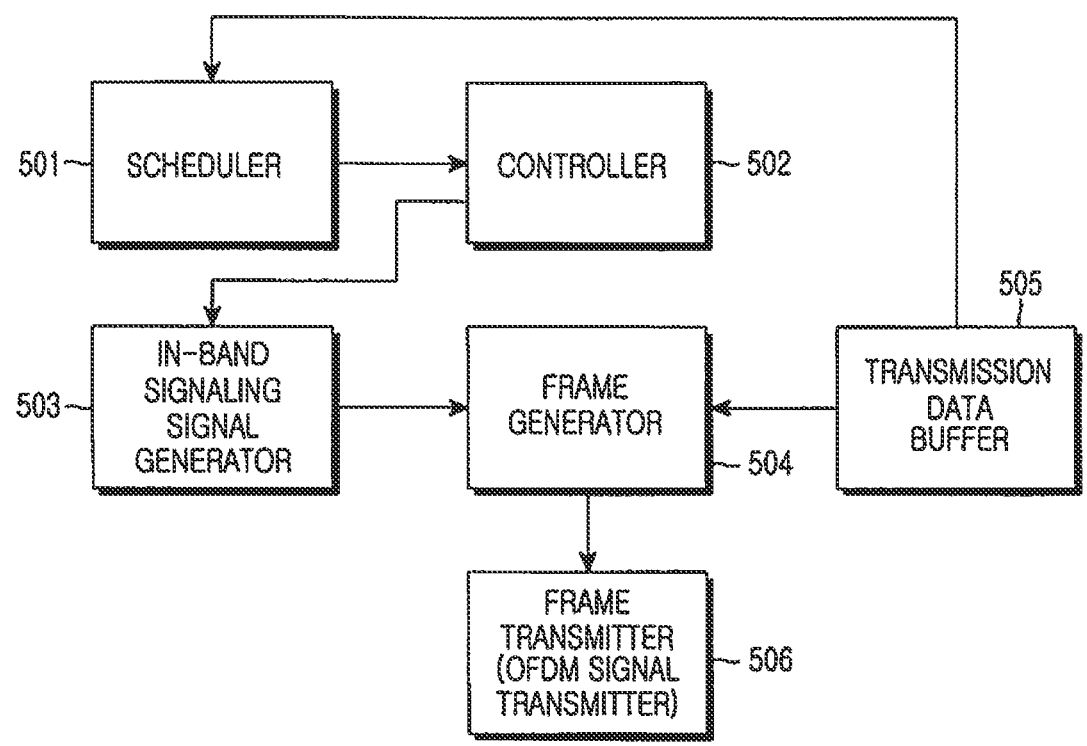
FIG. 5 illustrates a structure of a transmitter according to an embodiment of the present invention.

FIG. 5 illustrates a structure of a transmitter according to an embodiment of the present invention.

Referring to FIG. 5, the transmitter includes a scheduler 501, a controller 502, an in-band signaling signal generator 503, a frame generator 504, a transmission data buffer 505, and a frame transmitter 506. The transmission data buffer 505 may be, for example, a memory for storing broadcast service data provided from an upper layer. The broadcast service data stored in the transmission data buffer 505 is transmitted to a receiver over several broadcast service channels.

The scheduler 501 performs scheduling, after checking the broadcast service data stored in the transmission data buffer 505. The scheduling may include determining control information in a particular frame, i.e., L1 static information, L1 configurable information, or L1 dynamic information, PLP0 information, and at least one data PLP, taking into account the broadcast service data that the transmitter will transmit.

For example, when a broadcast service is supported over a wireless communication system, L1 static information, i.e., information such as a frame length and an RF channel number, is subject to change. In addition, L1 configurable information including a modulation order for each service and a data rate is changeable according to a particular broadcast service. Also, a broadcast service channel and location information of a particular PLP are variable. Therefore, the scheduler 501 sets the L1 static information, L1 configurable information, L1 dynamic information, PLP0 information, and data PLPs considering the broadcast service it will transmit. The scheduling results are provided to the controller 502.

The controller 502 controls the in-band signaling signal generator 503 to generate an in-band signaling signal. Herein, the in-band signaling signal generator 503, under the control of the controller 502, allocates a predetermined bit to each of the L1 static information, L1 configurable information, L1 dynamic information, and PLP0 information to set indication information for indicating a change/no-change in the information.

Alternatively, the in-band signaling signal generator 503 may allocate one bit for all of the L1 static information, L1 configurable information, L1 dynamic information, and PLP0 information to set indication information that indicates a change/no-change in the information using the one bit.

As another alternative, the in-band signaling signal generator 503 may allocate multiple bits for all of the L1 static information, L1 configurable information, L1 dynamic information, and PLP0 information to set indication information that indicates which of the frames following the current frame will include information changes.

Further, the controller 502 controls the frame generator 504 to generate a frame for a broadcast service. Herein, the frame generator 504, under the control of the controller 502, generates a frame that includes a preamble, an L1 signaling transmitted through a P2, an L2 signaling (PLP0 information) transmitted through a PLP0, and at least one data PLP.

In particular, in accordance with an embodiment of the present invention, the frame generator 504 receives the indication information set by the in-band signaling signal generator 503, i.e., the indication information for indicating a change/no-change in the L1 static information, L1 configurable information, L1 dynamic information, or PLP0 information in the next frame, and includes the indication information in a particular PLP of the current frame. That is, the frame generator 504 generates a frame including the indication information set by the in-band signaling signal generator 503 in a particular data PLP of the current frame.

Thereafter, frame transmitter 506 transmits the frame generated by the frame generator 504 to the receiver.

In accordance with an embodiment of the present invention, the transmitter can transmit the generated frame using Orthogonal Frequency Division Multiplexing (OFDM). Also, the transmitter may transmit the generated frame by Code Division Multiple Access (CDMA) or Time Division Multiplex Access (TDMA) according to the wireless communication system. The transmitter may also transmit the generated frame via multiple antennas using a Multiple Input Multiple Output (MIMO) communication scheme.

For example, when using OFDM, the frame transmitter 506 may have the same structure as that of an OFDM signal transmitter. In this case, the frame transmitter 506 can transmit the frame by means of a mapper for mapping information for a broadcast service, i.e., data PLP for a broadcast service, and a signaling PLP in which control information is allocated, to a particular subcarrier or subcarriers, an Inverse Fast Fourier Transformer (IFFT) for transforming a time-domain signal into a frequency-domain signal, and an inserter for inserting a Cyclic Prefix (CP) in the frequency-domain signal.

Although the transmitter of FIG. 5 is illustrated and described above as including separate components for each function, i.e., a scheduler 501 for scheduling, a controller 502 for controlling other components, an in-band signaling signal generator 503 for performing in-band signaling, a frame generator 504 for generating a frame, a transmission data buffer 505 for buffering, and a frame transmitter 506 transmitting the frame, these separate components are provided for ease of explanation and should not be construed as limiting to the embodiments of the present invention. That is, it is intended that the embodiments of the present invention are also enabled through a transmitter in which at least some of the functions described as being performed by separate components above are performed by a single component, e.g., a single component that performs the tasks of the scheduler 501 and the controller 502.

Figure 6:
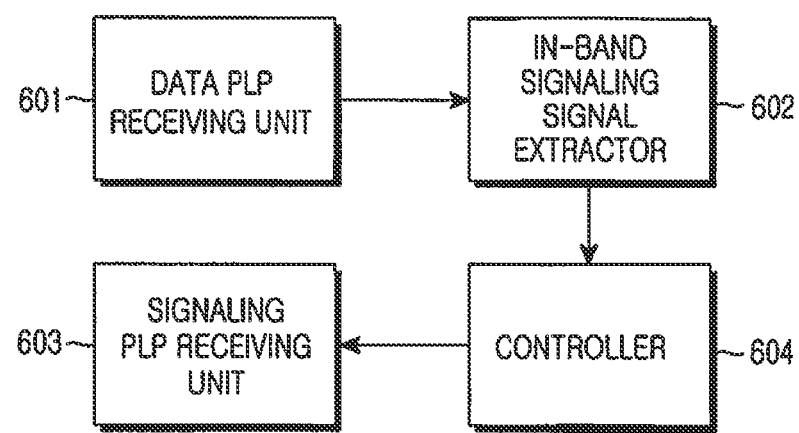
FIG. 6 illustrates a structure of a receiver according to an embodiment of the present invention.

FIG. 6 illustrates a structure of a receiver according to an embodiment of the present invention.

Referring to FIG. 6, a receiver includes a data PLP receiving unit 601, a signaling PLP receiving unit 603, an in-band signaling signal extractor 602, and a controller 604. The data PLP receiving unit 601 corresponds to a wireless signal processor in the general wireless communication system. That is, in an OFDM system, the data PLP receiving unit 601 receives a frame transmitted from a transmitter using a conventional OFDM signal receiving unit.

To receive a broadcast service, when the receiver receives an initial frame, it acquires synchronization with the frame by receiving a preamble by means of a preamble receiving unit (not shown) in the signaling PLP receiving unit 603. Further, the receiver receives L1 signaling information transmitted through a P2 symbol using an L1 signaling receiving unit (not shown). More specifically, the receiver acquires information on a broadcast service network, a frame length, the number of wireless channels for a broadcast service, service identifier information, a code rate, etc., as the L1 signaling information, and checks the basic information used to support the broadcast service it will receive. In addition, the receiver acquires information indicating a connection relation between each PLP transmitted through a PLP0 symbol and a broadcast service channel using an L2 signaling receiving unit (not shown), and checks information on a location where it will receive a data PLP(s) with regard to the broadcast service. Thereafter, the receiver receives a broadcast service channel in the transmitted data PLP using the data PLP receiving unit 601.

However, when receiving a non-initial frame, the receiver can receive only the broadcast service channel in a data PLP via the data PLP receiving unit 601, using the indication information extracted by the in-band signaling signal extractor 602, according to an embodiment of the present invention.

More specifically, the data PLP receiving unit 601 may include devices that perform an inverse operation of the transmitter described in connection with FIG. 5. In this case, the receiver can further include a demapper for demapping symbols corresponding to the information for a broadcast service from a particular subcarrier, a Fast Fourier Transformer (FFT) for transforming a frequency-domain signal into a time-domain signal, and a guard interval remover for removing a CP. In a system using CDMA or TDMA wireless communication scheme, the receiver can receive the data PLP with a structure corresponding to the communication scheme. However, because the structures of the receiving units are not the feature of the present invention, a detailed description thereof will be omitted herein.

The in-band signaling signal extractor 602 extracts indication information for indicating a change/no-change in the L1 static information, L1 configurable information, L1 dynamic information, or PLP0 information in the next frame, and the indication information is included in a particular PLP provided from the data PLP receiving unit 601. That is, the in-band signaling signal extractor 602 extracts, from a particular data PLP acquired by the data PLP receiving unit 601, the indication information indicating a change/no-change in any one of L1 static information, L1 configurable information, and L1 dynamic information, which are L1 signaling information transmitted through a P2 in the next frame, or extracts an in-band signaling signal, which is indication information for indicating a change/no-change in L2 signaling information transmitted through a PLP0. Also, the receiver extracts indication information indicating a change/no-change in L1 dynamic information, which is location information of the same PLP in the next frame.

The in-band signaling signal extracted by the in-band signaling signal extractor 602 is provided to the controller 604. The controller 604 turns off the signaling PLP receiving unit 603 using the extracted in-band signaling signal, to receive only the data PLP. Alternatively, the controller 604 turns on the data PLP receiving unit 601 and the signaling PLP receiving unit 603 to receive both the L1/L2 signaling information and the data PLP.

More specifically, when the indication information extracted from the in-band signaling signal indicates a change in the L1 static information, L1 configurable information, L1 dynamic information and/or L2 signaling information transmitted through a PLP0 in the next frame, the controller 604 turns on the signaling PLP receiving unit 603 at a receiving point of the L1 signaling or the L2 signaling to receive the changed signaling information. The controller 604 turns on the data PLP receiving unit 601 at a receiving point of the data PLP, which is transmitted after transmission of the L1 signaling or the L2 signaling, in order to receive the broadcast data transmitted through the broadcast service channel. That is, the controller 604 turns on both the data PLP receiving unit 601 and the signaling PLP receiving unit 603 to necessarily receive the changed L1 signaling or L2 signaling, making it possible to receive error-free broadcast data.

However, when the indication information extracted from the in-band signaling signal indicates no-change in the L1 static information, L1 configurable information, L1 dynamic information, and PLP0 information, the controller 604 turns off the signaling PLP receiving unit 603 at a receiving point of the L1 signaling or the L2 signaling, and turns on the data PLP receiving unit 601 at a receiving point of the data PLP which is transmitted after the transmission of the L1 signaling or the L2 signaling, in order to receive broadcast data through the broadcast service channel. That is, upon detecting no change information or the absence of changed control information from the in-band signaling signal, the controller 604 turns on only the data PLP receiving unit 601 to receive the broadcast data using the existing control information.

As described above, according to the present invention, the controller 604 checks indication information indicating a change/no-change in control information in the next frame, the indication information being transmitted through a data PLP that is presently being received from the in-band signaling signal extractor 602, and selectively turns on or off the data PLP receiving unit 601 or the signaling PLP receiving unit 603 depending on the indication information. In other words, the controller 604 minimizes power consumption of the receiver by efficiently controlling the receiving units 601 and 603. In addition, as the controller 604 detects a change/no-change in the control information before transmission of the next frame, the receiver can definitely receive the broadcast service channel without error.

Although the receiver of FIG. 6, like the transmitter of FIG. 5, is illustrated and described above as including separate components for each function, i.e., a data PLP receiving unit 601, a signaling PLP receiving unit 603, an in-band signaling signal extractor 602, and a controller 604, these separate components are provided for ease of explanation and should not be construed as limiting to the embodiments of the present invention. That is, it is intended that the embodiments of the present invention are also enabled through a receiver in which at least some of the functions described as being performed by separate components above are performed by a single component, e.g., a single component that performs the tasks of the data PLP receiving unit 601 and the in-band signaling signal extractor 602.

As is apparent from the foregoing description, according to the embodiments of the present invention, a transmitter transmits, through a PLP in the current frame, indication information for indicating a change/no-change in control information of a next frame, thereby enabling a receiver to selectively control reception of the control information and its power consumption for data reception. Herein, the frame includes a frame for the broadcast service, and also includes a superframe including at least one frame.

Therefore, the receiver detects, in the current superframe, the change/no-change in the control information of the next superframe depending on the indication information, and selectively turns on or off its receiving units to receive the control information, enabling accurate reception of the broadcast service.

In addition, the receiver can detect in advance the change in control information of the next superframe using the indication information, thereby making it possible to reduce power consumption of its receiving units and receive the broadcast service fewer fatal errors.

While the present invention has been shown and described with reference to certain embodiments, it will be understood by those skilled in the art that various changes in form and details may be made therein without departing from the spirit and scope of the present invention as defined by the appended claims and their equivalents.

What is claimed is:

1. A method for receiving a frame including control information in a broadcast system, the method comprising:
    receiving a frame that includes at least one Physical Layer Pipe (PLP), control information for a broadcast service, and indication information including a plurality of bits;
    extracting the indication information from the received frame; and
    determining a position of a frame where control information is to be changed based on the indication information,
    wherein the control information in the frame is not changed for a duration of one superframe comprising at least one frame,
    wherein the indication information indicates a number of one or more superframes ahead where the control information is to be changed,
    wherein if all bits of the indication information are "0", there are no superframes ahead where the control information is to be changed, and
    wherein if any of the bits of the indication information are "1", the "1" bits indicate the number of one or more superframes ahead where the control information is to be changed.

2. The method of claim 1, wherein the indication information is included in one data PLP through which broadcast data for the broadcast service is to be transmitted.

3. The method of claim 1, wherein the indication information indicates a position of a superframe where the changed control information is included.

4. The method of claim 1, wherein the control information comprises mapping information between the at least one PLP and a service channel over which broadcast data for the broadcast service is transmitted.

5. An apparatus for receiving a frame including control information in a broadcast system, the apparatus comprising:
    a receiving unit configured to receive a frame that includes at least one Physical Layer Pipe (PLP), control information for a broadcast service, and indication information including a plurality of bits;
    a signal extractor configured to extract the indication information from the received frame; and
    a controller configured to determine a position of a frame where control information is to be changed based on the indication information,
    wherein the control information in the frame is not changed for a duration of one superframe comprising at least one frame,
    wherein the indication information indicates a number of one or more superframes ahead where the control information is to be changed,
    wherein if all bits of the indication information are "0", there are no superframes ahead where the control information is to be changed, and
    wherein if any of the bits of the indication information are "1", the "1" bits indicate the number of one or more superframes ahead where the control information is to be changed.

6. The apparatus of claim 5, wherein the indication information is included in one data PLP through which broadcast data for the broadcast service is to be transmitted.

7. The apparatus of claim 5, wherein the indication information indicates a position of a superframe where the changed control information is included.

8. The apparatus of claim 5, wherein the control information comprises mapping information between the at least one PLP and a service channel over which broadcast data for the broadcast service is transmitted.

* * * * *